United States Patent
Schönberger et al.

(10) Patent No.: US 8,235,698 B2
(45) Date of Patent: Aug. 7, 2012

(54) BLOWING MACHINE AND AUTOMATIC CHANGER

(75) Inventors: Wolfgang Schönberger, Brennberg (DE); Christian Stoiber, Michelsneukirchen (DE)

(73) Assignee: Krones AG, Neutraubling (DE)

( * ) Notice: Subject to any disclaimer, the term of this patent is extended or adjusted under 35 U.S.C. 154(b) by 198 days.

(21) Appl. No.: 12/792,826

(22) Filed: Jun. 3, 2010

(65) Prior Publication Data

US 2010/0310705 A1 Dec. 9, 2010

(30) Foreign Application Priority Data

Jun. 3, 2009 (DE) .................. 10 2009 023 726

(51) Int. Cl.
*B29C 49/42* (2006.01)
*B29C 49/68* (2006.01)
(52) U.S. Cl. ......... 425/182; 425/186; 425/526; 425/534
(58) Field of Classification Search .................. 425/182, 425/186, 526, 534
See application file for complete search history.

(56) References Cited

U.S. PATENT DOCUMENTS

| | | | |
|---|---|---|---|
| 4,147,011 A | | 4/1979 | Kronseder et al. |
| 4,456,447 A | * | 6/1984 | Smith ........................... 425/182 |
| 4,572,355 A | | 2/1986 | Hunter |
| 5,882,285 A | * | 3/1999 | Seto et al. ........................ 483/29 |
| 2009/0061041 A1 | * | 3/2009 | Kiefl ............................. 425/534 |

FOREIGN PATENT DOCUMENTS

| | | |
|---|---|---|
| DE | 2261226 A1 | 6/1974 |
| DE | 3910293 A1 | 10/1990 |
| DE | 102007037400 A1 | 2/2009 |
| DE | 102007040620 A1 | 3/2009 |
| EP | 1112835 A2 | 7/2001 |
| EP | 197019 A1 | 9/2008 |
| EP | 2030759 A1 | 3/2009 |
| EP | 2050557 A1 | 4/2009 |
| JP | 06155397 A * | 6/1994 |
| JP | 2001150274 A * | 6/2001 |
| WO | WO-95/33616 A1 | 12/1995 |

OTHER PUBLICATIONS

German Search Report for 10 2009 023 726.7 mailed Sep. 24, 2009.
European Search Report for EP10163522.5 Dated Sep. 14, 2010.

* cited by examiner

*Primary Examiner* — Robert B Davis
(74) *Attorney, Agent, or Firm* — Marshall, Gerstein & Borun LLP (57) ABSTRACT

A blowing machine for containers, in particular bottles, with a preform heating module, to which a blow wheel is assigned and which contains a conveyor chain with exchangeable heating mandrels and optionally exchangeable shielding plates, with a service area provided on the conveyor chain in the heating module, in which an automatic changer for the automatic changeover of at least the heating mandrels is arranged. The automatic changer includes a magazine holder, a turret, which is adjustable and rotatable between the magazine holder and the conveyor chain, with grippers, and movably drivable unlocking components for engaging locks.

11 Claims, 4 Drawing Sheets

BLOWING MACHINE AND AUTOMATIC CHANGER

CROSS-REFERENCE TO RELATED APPLICATION

The present application claims the benefit of priority of German Application No. 102009023726.7, filed Jun. 3, 2009. The entire text of the priority application is incorporated herein by reference in its entirety.

FIELD OF THE DISCLOSURE

The disclosure relates to a blowing machine, such as for stretch blowing of containers such as plastic bottles, and an automatic changer for machine changeovers.

BACKGROUND

In a blowing machine, in particular a stretch blowing machine for plastic bottles, prefabricated preforms are conveyed along a conveyor line by a conveyor chain along heating stations of a heating module before they are processed in the blow wheel or the blowing station. Each preform is already formed with an opening which at least essentially corresponds to the opening of the finished bottle. On the conveyor chain heating mandrels are exchangeably held, which are adapted to the opening of the preform and loaded with preforms on entering the heating module, and which often rotate the preforms when passing through the heating module, and are then unloaded of the preforms, before said preforms are processed in the blowing station. Each preform is held at the opening by the heating mandrel inserted in it. Since many different types of container can be manufactured in the blowing machine, for example bottles, which require different openings (opening diameter, opening length, opening shape and retaining ring), the blowing machine for preforms must be retooled with a different opening, at least with regard to the heating mandrels. Apart from heating mandrels there are other fittings on the conveyor chain, such as shielding plates, which are often also to be changed during retooling. The shielding plate has a through passage for the heating mandrel or the preform, whereby the through passage should enclose the preform as tightly as possible to shield the opening in the heating module from unwanted thermal exposure. For preforms with a different opening length only the heating mandrels need to be optionally changed. For preforms with a different opening diameter usually the shielding plates also have to be changed. In practice these changing processes have so far been carried out manually and individually by operators, and are laborious and time-consuming, because there are up to 600 heating mandrels and shielding plates on the conveyor chain. The optionally high residual thermal stress is unpleasant for the operator and provokes erroneous changeovers. In addition, a manual changeover results in a very long downtime in production for the blowing machine or a complete plant in which the blowing machine is a component.

SUMMARY OF THE DISCLOSURE

The object of the disclosure is to provide a blowing machine and a universal automatic changer with which the operator can be relieved and changeover times can be significantly shortened during changeover.

In the blowing machine and due to the automatic changer at least the heating mandrels are changed automatically. In this way the operators are relieved and a changeover process is shortened substantially, because at least the heating mandrels and optionally also the shielding plates can, where required, be quickly changed, even in groups. Also, the risk of incorrect changeover is minimized. Due to the shorter changeover process the downtimes in production for the blowing machine and optionally for a complete plant line are significantly reduced. Even just with the changeover of a conveyor chain fitted with 300 heating mandrels, approximately fifty minutes can be saved in comparison to manual changeover. The automatic changer is mounted stationarily in a service area, which is optionally specially provided for this purpose, in the heating module and remains in the heating module in normal operation. This does not exclude however the automatic changer from being mobile in design and, where required, for docking in the service area and of being used optionally for other blowing machines. With the magazine holder, the turret with the grippers and the integrated or assigned unlocking components, the automatic changer is simple in construction and functionally reliable. The automatic changer can either be a fully integrated component of the heating module or is only used as required. To reduce the changeover time even further, a plurality of automatic changers can be used, which operate simultaneously with the blow wheel uncoupled and with the conveyor chain moving in steps. This also includes, for example, providing for an automatic changer for heating mandrels and an automatic changer for shielding plates, although the preference is for providing an automatic changer, which alternatively only changes the heating mandrels or the heating mandrels and the shielding plates. If the heating mandrels and the shielding plates are changed by one automatic changer, then this occurs sequentially, although this should also include that each heating mandrel is changed simultaneously with the shielding plate assigned to it.

In order to be able to carry out the changeover process quickly, it is expedient if a buffer system for at least the heating mandrels, preferably also the shielding plates, is assigned to the automatic changer. The buffer system is preferably designed for making magazines available, which each contain a group of heating mandrels or shielding plates. Optionally, the automatic changer is discharged and charged individually, but the heating mandrels and optionally shielding plates can also be buffered without magazines.

In an alternative the automatic changer can be manually charged and discharged from the buffer system by at least one operator. This manual intermediate step is simple and convenient for the operator, whereby it can be ensured through appropriate design of the automatic changer that no erroneous charging is possible.

In a preferred embodiment even at least one robot is provided for automatic charging and discharging of the automatic changer from the buffer system. The cycling of the conveyor chain, control of the automatic changer and charging and discharging of the automatic changer from the buffer system are expediently carried out electronically and computer controlled in mutual correlation. Compared to the manual charging and discharging of the automatic changer A, with the use of at least one robot R a time saving of about 5% can be optionally achieved.

For the case that only the heating mandrels are automatically changed, which are arranged in receptacles in spindles which move on the conveyor chain relative to the shielding plates, a spindle bridge with a spindle movement mechanism can be supported either stationarily or on the automatic changer in the service area. To change each heating mandrel it is displaced by means of the spindle movement mechanism on far relative to the shielding plate that it can be conveniently grasped or placed in position. In conveyor chains of this nature equipped with spindles the spindles have the task of rotating the heating mandrel in the heating module and of temporarily moving it, for loading it with a preform and for discharging, to a charging or discharging station, for example via a displacement of about 44 mm linearly. This situation on the conveyor chain, designed for the proper functioning of the blowing machine, is also used beneficially by the automatic changer for the automatic changeover of only the heating mandrels.

In an expedient embodiment the automatic changer comprises in a frame base a magazine holder, a removal and insertion turret arranged in a linear unit adjustable between at least one waiting position and at least one changing position and with adjustable grippers, and movably drivable unlocking components, positioned in the region of the conveyor chain, for engaging locks on the conveyor chain.

The unlocking components are expediently arranged with actuators either on the spindle bridge or on the automatic changer, whereby the unlocking components, adjustable by the actuators, preferably pneumatic cylinders, can be extendable and raisable forks or fingers for heating mandrel locks and/or extendable pressure pins for shielding plate locks. In an advantageous further development the pressure pins can also be realized as pressure plates. The forks or fingers can either be inserted between the shielding plate plug-on feet or at the side next to them if only the heating mandrels are to be changed, and are thereafter or during the process raised to release the correspondingly formed heating mandrel lock. Expediently, the unlocking components can be combined into groups in order to be able to simultaneously change a group of heating mandrels and/or shielding plates.

In an expedient embodiment the magazine holder is a table which pivots about an approximately vertical axis, preferably by 180° to and fro, in the frame base and on which at least one magazine clamping device is arranged. This simplifies the charging and discharging of the magazine holder.

In a favorable embodiment the turret with the grippers arranged on it can be rotationally driven in the frame base and on the linear unit in steps about a horizontal axis. The turret has either only grippers for heating mandrels or alternating grippers in the direction of rotation for heating mandrels and shielding plates. The grippers alternate with one another, for example, with 90° divisions.

In an expedient embodiment initially unlocked shielding plates followed by unlocked heating mandrels can be removed with the automatic changer in a changeover cycle using the turret, before the heating mandrels to be inserted and then the shielding plates to be inserted can be fitted. The turret here expediently forms a temporary store independent of the buffer system for the heating mandrels and shielding plates removed and to be inserted during a changeover cycle. This embodiment is a particularly important aspect of the disclosure, because the automatic changer is formed universally for the automatic changeover of only the heating mandrels and/or for the sequential changeover of the heating mandrels and shielding plates, and thus offers the user of a plant line including a blowing machine universally usable equipment, which with the same automatic changer facilitates short changeovers irrespective of whether for a modification, for example of only the opening length with shielding plates remaining on the conveyor chain, only the heating mandrels are to be changed, or, for example with the modification of the opening diameter, the shielding plates and the heating mandrels are to be changed. This is a substantial advantage, particularly for users who process many different containers in relatively small production runs and have to frequently retool.

On the automatic changer itself no time-consuming retooling work is required for this, since the different changeover modes can be simply controlled by the controller.

Expediently, the buffer system comprises at least a shelf, a table, a changer carriage, a paternoster store, a carousel, or a similar storage device, preferably either with individual storage points for heating mandrels and/or shielding plates or with magazine storage points for heating mandrel and shielding plate magazines.

With one expedient embodiment of the automatic changer it is assigned at least a magazine buffer system at least for heating mandrel groups which are removed and to be inserted, preferably even also shielding plate groups. This buffer system can, for example, hold magazines ready in which in each case groups of heating mandrels or automatic changers are supported and positioned ready. The full magazines or the individual heating mandrels or respectively shielding plates are transferred either manually by an operator or in a fully automatic sequence by at least one robot, which is arranged between the automatic changer and the buffer system.

BRIEF DESCRIPTION OF THE DRAWINGS

Embodiments of the object of the disclosure are described based on the drawings. The following are shown.

DETAILED DESCRIPTION OF THE PREFERRED EMBODIMENT

Figure 1:
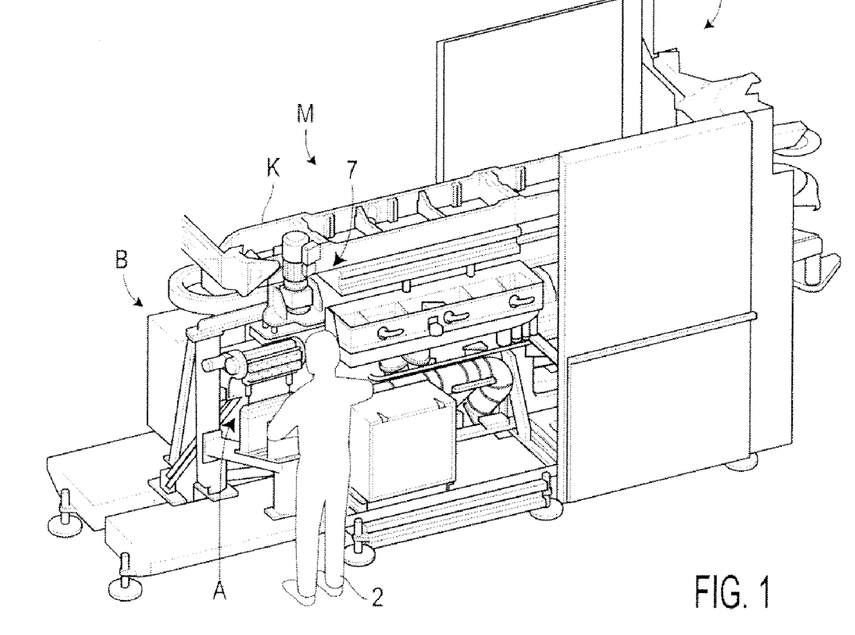
FIG. 1 a perspective schematic representation of a heating module of a blowing machine with an automatic changer, FIG. 2 the automatic changer in association with a conveyor chain of a heating module, FIG. 3 a side view of the automatic changer with an assigned buffer system, FIG. 4 a side view of the automatic changer with an assigned buffer system and at least one robot arranged between them, FIG. 5 magazines for heating mandrel groups and shielding plate groups, FIG. 6 a side view in the region of the conveyor chain, FIG. 7 a partial sectional view, enlarged to scale, of changing a shielding plate, FIG. 8 a partial sectional view, enlarged to scale, of changing a heating mandrel, and FIG. 9 a side view of a detail when changing, for example, a heating mandrel.

FIG. 1 shows, for example as part of a plant line, a blowing machine M for the manufacture of containers, for example plastic bottles, which comprises a heating module H and a blowing station or a blow wheel B (the latter not shown in detail; B relates only to the position of where it should be arranged). In the heating module H preforms are moved past heating stations by means of a conveyor chain K, whereby on the conveyor chain K at least one service area 1 is left free in which an automatic changer A, for example, is integrated into the blowing machine M. The automatic changer A is a modular construction of a plurality of modules, and is used for the automatic changeover of heating mandrels and/or shielding plates (not shown in FIG. 1) arranged alternately on the conveyor chain K. The service area 1 is located for example in the vicinity of the diversion region of the conveyor chain K, or in the vicinity of the interface to the blowing station B, which can be uncoupled from the conveyor chain K for a changeover process. Particularly preferably, the service area 1 is located between two diversion regions of the conveyor chain K. Thus, easy handling in a straight section of the conveyor chain is facilitated. With the automatic changer A an operator 2 is indicated who, for example, charges or discharges the automatic changer manually.

The preforms are loaded onto the heating mandrels in or before the heating module H and are transported by them to the blowing station B for heat treatment and are discharged and transferred in this region from the heating mandrels again. Since on the preforms the opening regions are already largely preformed to the opening region of the subsequent container and have to be protected against inexpedient heating, each heating mandrel is generally assigned a shielding plate, whereby the heating mandrels and shielding plates are explained in detail based on the further figures.

Figure 2:
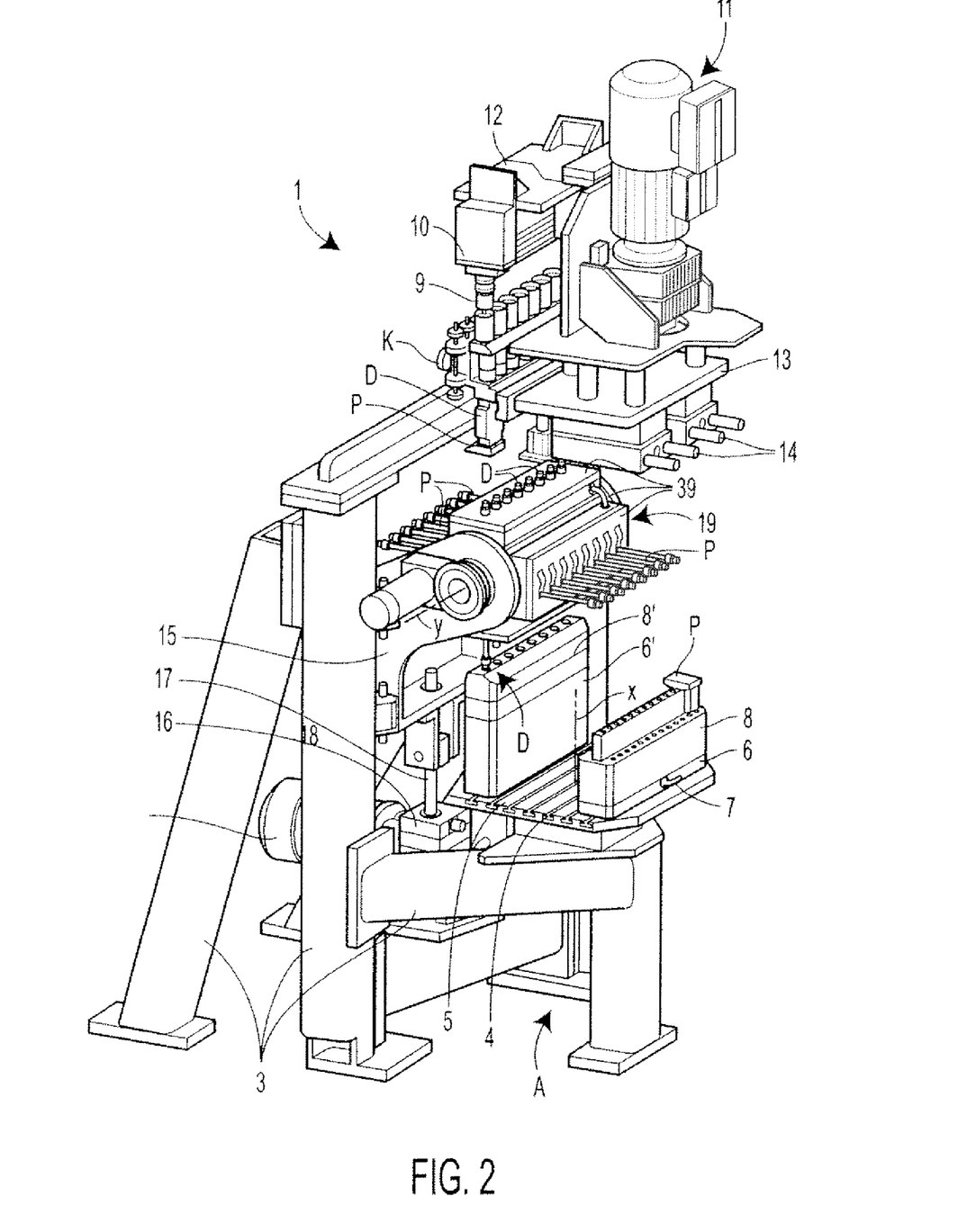

The automatic changer in FIG. 2 has a strong frame base 3 with posts, transverse bars and foundations and includes either an electronic control device or is connected to one (not illustrated). As mentioned, the automatic changer A consists of a plurality of modules integrated into the frame base 3 and as equipment of the heating module H or of the blowing machine M is functionally assigned in the service area 1 to a section of the conveyor chain K. The automatic changer A is expediently installed stationarily and permanently below the service area 1 of the conveyor chain K. In the service area 1 a spindle bridge 11, for example, is mounted stationarily on a supporting structure 12, to which a supporting plate 13 is arranged on the underside which bears the drivable unlocking components 14. In an alternative embodiment the unlocking components 14 could also be directly arranged, for example, on the frame base 3 of the automatic changer A. The conveyor chain K has in this embodiment spindles 9 rotationally supported on chain links and which are driven by a drive motor for rotation, for example, on the spindle bridge 11 during the passage of the preforms through the heating module H, and can also be lowered in the vertical direction by a predetermined displacement from the illustrated position (double arrow 10) against a spring force, and in fact in a charging region at the start of the conveyor line to charge the preforms and also, in a discharge region, to discharge the preforms and transfer them to the blowing station. In FIG. 2 a heating mandrel D and an assigned shielding plate P are illustrated. Expediently, each chain link has at least one spindle 9, one heating mandrel D and one shielding plate P.

In the frame base 3 the automatic changer A in FIG. 2 has a magazine holder 4, for example, a table 5 with clamping grooves for magazine holders 6, 6', which, for example, can be rotated to and fro by 180° around an approximately vertical axis X. Each magazine holder 6, 6' has, for example, a clamping device 7 for the releasable fixing of a magazine 8 resp. 8'. In the magazine 8 a group of shielding plates P (only one is shown in FIG. 2) is positioned ready, for example six to eight shielding plates P. In the magazine 8' a group of heating mandrels D (only one is shown in FIG. 2) is positioned ready, for example six or eight heating mandrels D.

In the frame base 3 adjacent to the magazine holder 4 a linear unit is arranged, which can be composed of cheeks 15 which are linearly movable vertically in the frame base, a gear 16, a spindle drive 17 and a drive motor 18 and bears a removal and insertion turret 19 which is pivotable about an essentially horizontal axis Y. On the turret 19 and distributed in the circumferential direction (e.g. in 90° divisions) grippers 39 or 39' with gripper drives, which are not outlined in further detail, are in each case accommodated. Two grippers 39', mutually offset by 180°, are each used for fixing a group of heating mandrels D, whereas the two other grippers 39, similarly mutually offset by 180°, are each used for fixing a group of shielding plates P. The turret 19 can be adjusted between a transfer position, illustrated in FIG. 2, in the vicinity of the magazine holder 4 and at least one not illustrated, raised insertion position by means of the linear unit and is driven, for example, by a drive 20. The pivoting capability of the magazine holder 4 about the vertical axis X facilitates the charging and discharging of the magazine holder 4 with magazines 8, 8', for example manually by the operator 2, who is indicated in FIG. 1, and apportions the magazines 8, 8' for the transfer or delivery by the turret 19.

Since the turret 19 holds in each case a group of heating mandrels D or shielding plates P for insertion and also in each case accepts a group of heating mandrels and shielding plates D, P after a changeover, it acts as a temporary store or temporary buffer.

Although the automatic changer A illustrated in FIGS. 1 and 2 is in each case designed for exchanging a group of heating mandrels D and/or shielding plates P, in an alternative embodiment it could also be designed such that it automatically exchanges the heating mandrels D and the shielding plates P.

Figure 3:
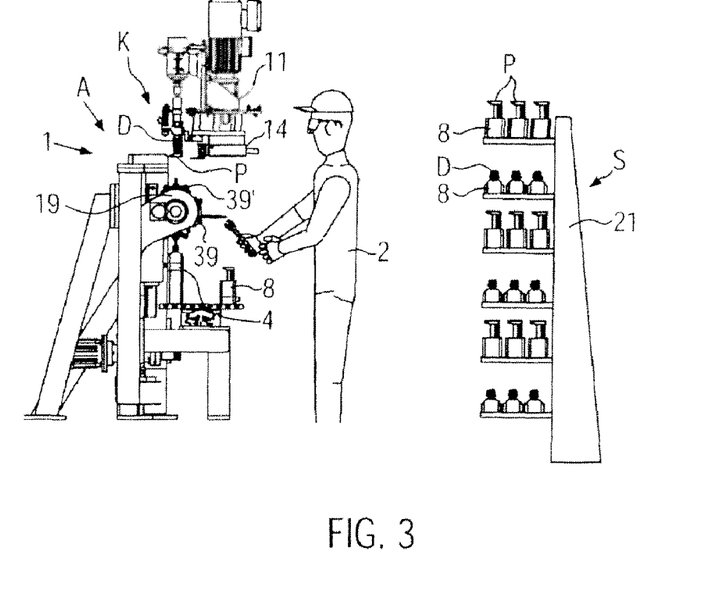

Analogous to FIG. 1, FIG. 3 illustrates in a side view the automatic changer A, an operator 2 and a buffer system S assigned to the automatic changer A for holding ready and storing the magazines 8, 8'. The buffer system S comprises, for example, at least a shelf 21, or, not illustrated, a table, a fittings changer carriage, a paternoster store, a carousel or another storage method, which is functionally assigned to the automatic changer A such that, for example, the operator 2 can conveniently and manually carry out the charging and discharging of the automatic changer A.

Figure 4:
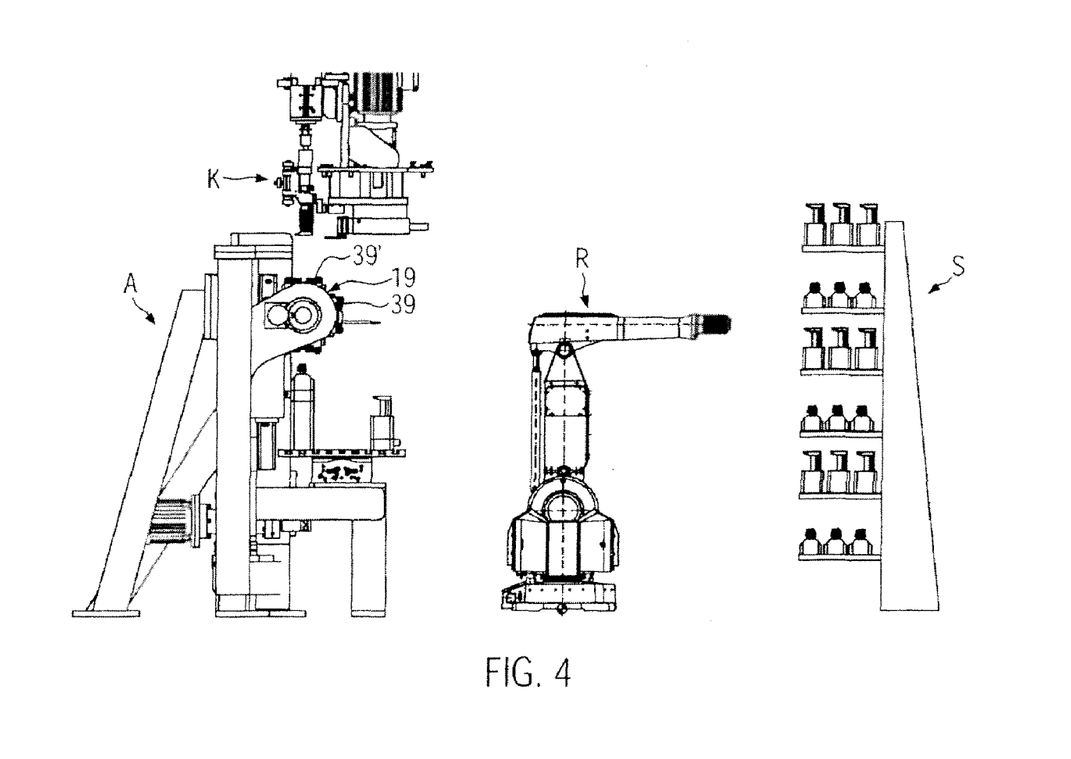

In contrast, FIG. 4 shows in a side view a fully automatic changer system, consisting of the automatic changer A, buffer system S and at least one robot R arranged between them, which carries out the charging and discharging of the automatic changer A from the buffer system S fully automatically. Instead of a robot R, other handling systems, such as for example, linear axes, can be used.

Figure 5:
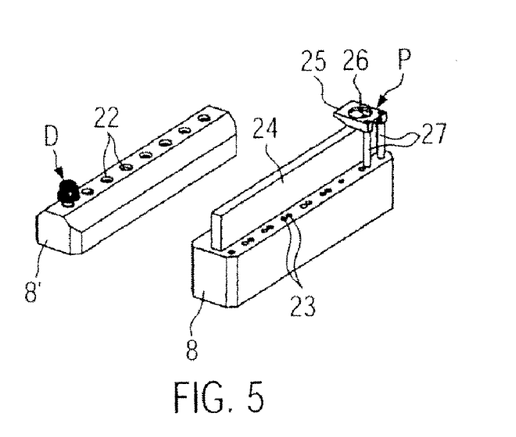

FIG. 5 illustrates the magazines 8, 8'. Each magazine 8 is used for the storage of a plurality of, for example eight, shielding plates P, each containing a plate body 25 with a passage 26 for an end of the heating mandrel D and the preform charged on it, as well as having plug-on feet 27 arranged on the plate body 25 for fixing and positioning the shielding plate P on the conveyor chain K. The plug-on feet 27 are, for example, plugged into openings 23 of the magazine 8. The loaded shielding plates P can be additionally secured by a ridge 24. The magazine 8' for the heating mandrels D has a row of spaced openings 22 into which the heating mandrels D fit. The magazines 8, 8' are for example die-cast moulded parts. The number of heating mandrels D or shielding plates P can comprise any number, whereby expediently the numbers amongst themselves are equal.

Figure 6:
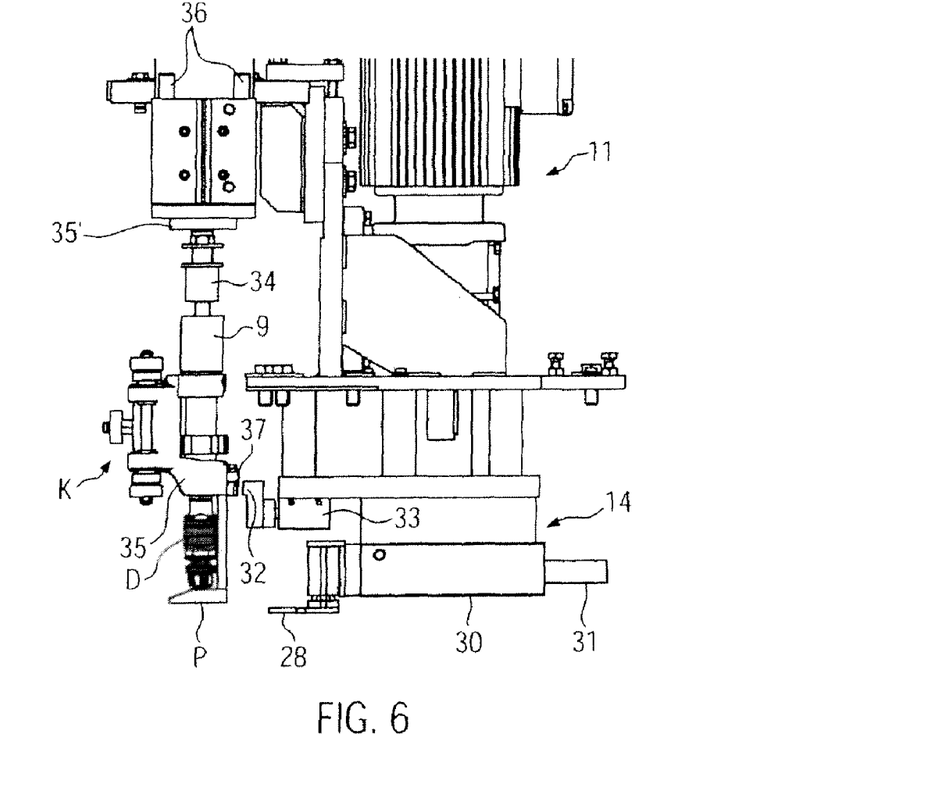
Figure 7:
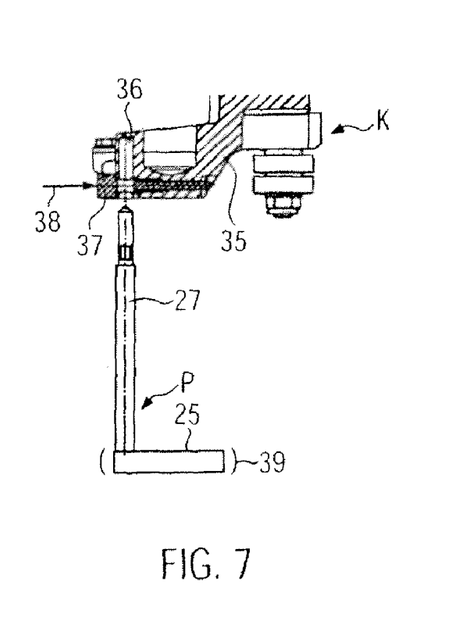
Figure 8:
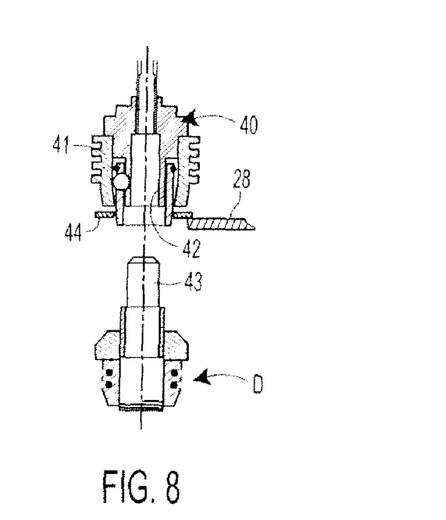

In a side view FIG. 6 illustrates the conveyor chain K and the spindle bridge 11 for an automatic changeover of both the shielding plates P and the heating mandrels D. The unlocking components 14 are for example forks or fingers 28 for releasing heating mandrel locks 44 (FIG. 8) and pressure pins or pressure plates 32 for releasing shielding plate locks 37 (FIG. 7). The forks 28 or fingers can be adjustable by means of at least one actuator 29, e.g. a pneumatic cylinder, in the upwards direction and additionally in the horizontal direction in a housing 30 via at least one further actuator 31, preferably a pneumatic cylinder. The pressure fingers 32 can be adjusted by means of at least one actuator 33, for example a pneumatic cylinder, in the horizontal direction and, for example, positioned to the height of the shielding plate locks 37, which in each case are located constructionally separate from the heating mandrel receptacle 42 (refer also to FIGS. 7 and 8) in a body 35 of a chain link.

Figure 9:
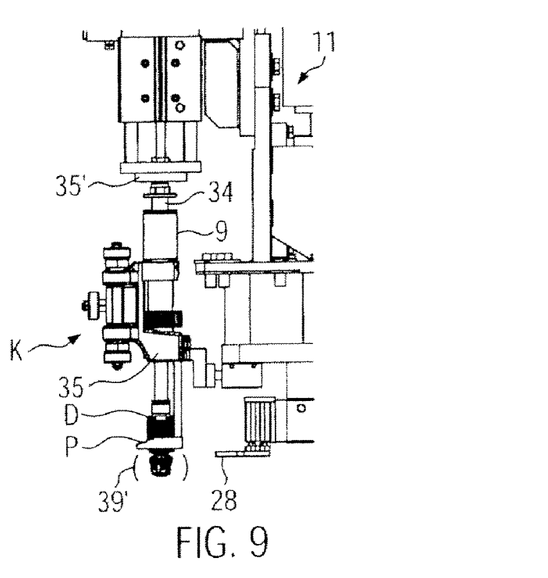

On the spindle bridge 11 in FIG. 6 a forcing plate 35 is movably supported in the upwards direction, which can be lowered by actuators 36, e.g. pneumatic cylinders, from the position shown in FIG. 6 into the position illustrated in FIG. 9 to displace a shaft 34 in the spindle 9 and thus displace the heating mandrel receptacle 42 (FIG. 8) temporarily downwards until the lower end of the heating mandrel D protrudes downwards through the shielding plate P and is easier to grasp.

FIG. 6 illustrates a starting situation for an automatic changeover of both the shielding plates P and the heating mandrels D. In this case the actuators 36 are optionally not operated, because firstly (FIG. 7) the shielding plates P are released by means of the pressure pins 32 and removed by the gripper 39 of the turret 19, and only then can the heating mandrels D, which are then exposed, be removed, after releasing the heating mandrel locks 44 by means of the forks or fingers 28, by the gripper 39' of the turret 19 which has rotated further by one division. The heating mandrel receptacle 42 is moulded in a, for example, body 40 of the chain link joined to the shaft 34 and at the lower end bears the heating mandrel lock 44, e.g. an annular ring, which only has to be briefly pressed upwards to release the ball lock 41 against the spring force from the fork or a finger 28. Although with the sequential changeover of the heating mandrels D and the shielding plate P the actuation of the forcing plate 35 is not essential, the forcing plate 35 can however be used to position the heating mandrels D better for the gripper 39' of the turret 19 and to manage with a shorter vertical stroke of the turret 19.

In the following the turret 19, which temporarily stores the removed shielding plates P and heating mandrels D, is rotated by a division to bring the heating mandrels D to be inserted into the insertion position. Of course, the turret 19 is in each case temporarily lowered between the removal of the shielding plates P and the removal of the heating mandrels D and appropriately rotated and then elevated again by means of the linear unit.

The heating mandrels D to be inserted are now aligned with shafts 43 to the heating mandrel receptacles 42 (refer to FIG. 8) and are introduced into the heating mandrel receptacles 42 by elevating the turret 19 and locked therein for example automatically by means of ball locks 41 before the gripper 39' is opened and the turret 19 travels downwards again. Once the heating mandrels D are properly inserted, the turret 19 travels down again and is subsequently or during the movement further rotated by a division so that the shielding plates P to be inserted are ready for insertion with plug-on feet 27 (FIG. 7) aligned upwards. The turret 19 again moves upwards and pushes the plug-on feet 27 of the shielding plates P held by the gripper 39 into the holes 36 of the chain link body 35, whereupon the plug-on feet 27 are automatically locked by the shielding plate lock 37, for example by a pin, which is movable against a spring force and which engages an opening in a retaining groove in the plug-on foot 27. Apart from that, the arrow 38 in FIG. 7 indicates the pressure direction of the pressure pins 32 for releasing the shielding plate lock 37.

Then the gripper 39 is opened and the turret 19 travels downwards again. This completes a changeover cycle both for the heating mandrels D and the shielding plates P. Although this is not absolutely essential, the pressure plate 35 can also be moved temporarily downwards for the changeover of the heating mandrels D to facilitate grasping the heating mandrels D to be changed and/or to bring the heating mandrel lock 44 closer to the forks or fingers 28 and/or to manage with a shorter positioning stroke of the turret 19 which takes less time.

Subsequently or already during the changeover cycle, the turret 19 can charge removed heating mandrels D and shielding plates P into the magazines 8, 8' on the magazine holder 4 through appropriate lowering movements and rotations about the axis Y before the magazines 8, 8' are transferred into the buffer system S and replaced by new full magazines 8, 8'. This can be carried out by either the operator 2 or fully automatically by the robot R. Thereafter the automatic changer is ready for a new changeover cycle. The conveyor chain K is transported further by an appropriate distance so that the heating mandrels and shielding plates D, P to be changed next are brought into the service area 1 and to the automatic changer A. Alternatively, the heating mandrels D and shielding plates P could also be transferred individually.

The same automatic changer can also just automatically change the heating mandrels D according to FIG. 9, if the shielding plates P remain on the conveyor chain K, because they also fit the new heating mandrels D or preforms. At the start of a changeover cycle of this nature the turret 19 is first aligned with the empty gripper 39' on the heating mandrels D and elevated until the gripper 39' is located in a raised position ready for accepting the heating mandrels D. The gripper 39', offset by 180°, is charged. Simultaneously, thereafter or previously, the forcing plate 35 is moved downwards to press the shafts 34 of the group of the heating mandrels D to be removed in the spindles 9 downwards until the lower ends of the heating mandrels D (FIG. 9) protrude downwards beyond the shielding plates P and enter the region of the gripper 39'. The gripper 39' grips the heating mandrels D while or before the forks or fingers 28 have released the heating mandrel locks 44, whereupon the turret 19 moves downwards and withdraws the heating mandrels D. Then the turret 19 is rotated by a 180° division to align the heating mandrels D to be inserted to the heating mandrel receptacles 42 and the removed heating mandrels D are optionally inserted into an empty magazine 8'. The turret 19 again moves upwards and pushes the shafts 43 of the heating mandrels D into the heating mandrel receptacles 42 in which they are locked by the ball lock 41. The forks or fingers 28 have already been removed previously from the heating mandrel locks 44. The changeover cycle is thus concluded. The forcing plate 35 is raised again before the conveyor chain K is transported further by an appropriate amount in order to change the next group of heating mandrels D. Only then, the turret 19 optionally transfers the removed heating mandrels D to the magazine 8', which transfers into the buffer system S and is replaced by a magazine 8' with heating mandrels D to be inserted and this is done either by the operator 2 or fully automatically by the robot R. In order to change the automatic changer A between the two different changeover modes no retooling work is needed, but instead only switching from one mode to the other needs to be carried out on the controller. The changeover modes can be designed differently in their sequence. An example is given in the following.

Brief description of the two different changeover modes with a changeover cycle for each one:

Mode for automatic changeover of the heating mandrels D and the shielding plates P:

The turret 19 has in each case a loaded and an empty gripper 39, 39'.

The linear unit moves the turret 19 upwards, which points upwards and has the empty gripper 39 for the shielding plates P.

The gripper 39 clamps the shielding plates P.

The pressure pins 32 move out and release the shielding plate locks 37.

The linear unit pulls the turret 19 downwards and removes the shielding plate P.

The turret 19 is rotated by 90° to align the empty gripper 39' for heating mandrels D upwards.

Option: Optionally, the forcing plate 35 moves downwards on the spindle bridge 11 and presses out the heating mandrels D.

The linear unit moves the turret 19 upwards.

The empty gripper 39' grips the heating mandrels D.

The forks or fingers 28 are brought to engage the heating mandrel locks 44 and to release them.

The linear unit moves the turret 19 with the engaged heating mandrels D downwards.

The turret 19 is rotated by 90° in each case and inserts the heating mandrels D and shielding plates P into an empty magazine 8, 8' and in each case moves slightly higher while the table 5 is rotated by 180°.

The forks or fingers 28 are withdrawn.

The operator 2 or the robot R charges either a new magazine 8, 8' on the table 5 with heating mandrels D and shielding plates P to be inserted or charges the magazine holder 4 with the magazines 8, 8' containing the new heating mandrels D and shielding plates P, and transfers the removed heating mandrels D and shielding plates P or the magazines 8, 8' into the buffer system S.

The table 5 is previously or thereafter in each case rotated 180° about the axis X.

The linear unit moves the turret 19 downwards.

The grippers 39, 39' grip further heating mandrels D and shielding plates P to be inserted.

The linear unit moves the turret 19 upwards into a central position.

The turret 19 is optionally rotated by 180° about the Y axis.

The linear unit moves the turret 19 fully upwards and inserts the heating mandrels D into the heating mandrel receptacles.

The gripper 39' releases itself from the heating mandrels D.

The turret 19 is lowered and rotated by 90° about the Y axis.

The linear unit moves the turret 19 downwards.

The gripper 39 grips additional shielding plates P to be inserted.

The linear unit moves the turret 19 upwards into a central position.

The turret 19 is optionally rotated by 180° about the Y axis.

Option: On the spindle bridge 11 the forcing plate 35 moves upwards.

The linear unit moves the turret 19 fully upwards and inserts the shielding plates P into the chain link.

The gripper 39 releases itself from the shielding plates P.

The linear unit moves the turret 19 back into the central position.

The pressure pins 32 move back into the starting position.

The conveyor chain K is incremented by a certain number of divisions.

A new changeover cycle starts until finally all heating mandrels D and shielding plates P have been changed.

Changeover mode only for the heating mandrels D:

The turret 19 has a charged gripper 39' and an empty gripper 39'.

The linear unit moves the turret 19 with the empty gripper 39' aligned upwards for the heating mandrels D to be removed upwards until a central position is reached.

On the spindle bridge 11 the forcing plate 35 moves downwards and presses the heating mandrels D forwards until they protrude from the shielding plates P.

The linear unit moves the turret 19 upwards until the heating mandrels D have entered the empty gripper 39'.

The gripper 39' clamps the heating mandrels D to be removed.

The forks or fingers 28 actuate the heating mandrel locks 44 and release the heating mandrels D.

The linear unit moves the turret 19 with the engaged heating mandrels D downwards.

The forks or fingers 28 are withdrawn.

The linear unit moves the turret 19 downwards, the turret rotates by 180° and transfers the removed heating mandrels D to the empty magazine 8' on the table 5.

The gripper 39' is released before the turret 19 moves upwards.

The table 5 is rotated by 180° in order to align the magazine 8' with the removed heating mandrels D to the buffer system S, and to simultaneously position a new magazine 8' below the empty gripper 39' of the turret 19.

The operator 2 or the robot R transfers the magazine 8' with the removed heating mandrels D into the buffer system S and transfers a new magazine 8' with the heating mandrels D to be inserted to the table 5, on which it is positioned and clamped to the magazine holder.

The linear unit moves the turret 19 downwards until the gripper 39' has grasped the heating mandrels D to be inserted.

The linear unit moves the turret 19 upwards into a central position.

The turret 19 is optionally rotated by 180°.

The linear unit moves the turret 19 fully upwards, which inserts the heating mandrels D to be inserted into the heating mandrel receptacles 42 which are pressed downwards.

The gripper 39' releases itself from the inserted heating mandrels D.

The linear unit moves the turret 19 downwards.

The forcing plate 35 is adjusted upwards on the spindle bridge 11.

The turret 19 is rotated by 180° and transfers the removed heating mandrels into the empty magazine 8'.

The gripper 39' is released and the turret 19 is moved upwards into a central position.

The table 5 is rotated by 180° about the X axis to align the magazine 8' with the removed heating mandrels D to the buffer system S and to align a new magazine 8' with heating mandrels D to be inserted on the empty gripper 39' of the turret 19.

The operator 2 or the robot R transfers the magazine 8' with the removed heating mandrels D into the buffer system S and transfers a new magazine 8' with the heating mandrels D to be inserted to the table 5.

The conveyor chain K is incremented by a certain number of divisions.

The changeover cycle for a group of heating mandrels is concluded.

The invention claimed is:

1. Blowing machine for containers, in particular bottles, with a preform heating module associated to a blowing station and containing a conveyor chain with holders for exchangeable heating mandrels and exchangeable shielding plates, at least one automatic changer for the automatic changeover of at least the heating mandrels by use of at least one unlocking component actuated by at least one actuator, the automatic changer being arranged at a location close to the conveyor chain in a service area within the preform heating module, the automatic changer comprising at least a magazine and grippers for removing and inserting at least the heating mandrels, wherein the automatic changer has a frame base provided with a magazine holder for at least one magazine, with a linear unit adjacent to the magazine holder, the linear unit carrying a removal and insertion turret equipped with the grippers, the removal and insertion turret being rotatable on the linear unit about a horizontal axis, the linear unit being adjustable in the frame base linearly and vertically with respect to the magazine holder, to adjust the removal and insertion turret between a transfer position adjacent to the magazine holder and a raised insertion position close to the holders on the conveyor chain, and wherein the unlocking components are provided one of integrated into the frame base or functionally associated to the automatic changer, the unlocking components serving for releasing at least heating mandrel locks arranged in the holders on the conveyor chain.

2. Blowing machine according to claim 1, wherein the magazine holder is a table which pivots about an approximately vertical axis in the frame base and on which at least one magazine clamping device is arranged on at least one magazine holder means arranged on the table for releasably fixing a respective magazine.

3. Blowing machine according to claim 1, wherein the removal and insertion turret is rotationally drivable in steps about the horizontal axis of rotation on the linear unit by a drive of the removal and insertion turret.

4. Blowing machine according to claim 1, wherein the removal and insertion turret forms a temporary store at least for heating mandrels independently of a buffer system at least for heating mandrels and assigned to the automatic changer.

5. Blowing machine according to claim 4, wherein at least one robot is provided for the automatic charging and discharging of the automatic changer from the assigned buffer system.

6. Blowing machine according to claim 1, wherein the preform heating mandrels are arranged in receptacles of spindles which are moveable in the holders on the conveyor chain relative to the shielding plates, and wherein a spindle movement mechanism is arranged either stationarily on a stationarily mounted spindle bridge or on the automatic changer.

7. Blowing machine according to claim 1, wherein the unlocking components are arranged with the actuators on a spindle bridge stationarily mounted in the vicinity of the conveyor chain, the unlocking components being either forks or fingers which can be extended and raised by actuators for releasing the heating mandrel locks, and/or pressure pins being extendable by actuators for releasing shielding plate locks.

8. Blowing machine according to claim 4, wherein the buffer system has one of at least a shelf, a table, a changer carriage, a paternoster store, and a carousel.

9. Automatic changer for exchanging at least preform heating mandrels exchangeably inserted in holders of a conveyor chain of a preform heating module by use of at least preform mandrel unlocking components, the automatic changer comprising at least a magazine for preform heating mandrels and grippers for removing and inserting at least the heating mandrels, wherein the automatic changer has a frame base provided with a magazine holder for at least one magazine, with a linear unit adjacent to the magazine holder, the linear unit carrying a removal and insertion turret equipped with the grippers, the removal and insertion turret being rotatable on the linear unit about a horizontal axis, the linear unit being adjustable in the frame linearly and vertically with respect to the magazine holder, to adjust the removable and insertion turret between a transfer position adjacent to the magazine holder and a raised insertion position close to the holders on the conveyor chain, and, wherein the unlocking components are provided one of integrated into the frame base or functionally associated to the automatic changer, the unlocking components serving for releasing at least heating mandrel locks arranged in the holder on the conveyor chain.

10. Blowing machine according to claim 1, wherein the insertion and removal turret is equipped with either only grippers for preform heating mandrels or, alternating in the direction of rotation of the insertion and removal turret with grippers for preform heating mandrels and for shielding plates.

11. Blowing machine according to claim 7, wherein the actuators of the at least preform heating mandrel unlocking components are pneumatic cylinders.

* * * * *

UNITED STATES PATENT AND TRADEMARK OFFICE
CERTIFICATE OF CORRECTION

PATENT NO.        : 8,235,698 B2                                Page 1 of 1
APPLICATION NO.   : 12/792826
DATED             : August 7, 2012
INVENTOR(S)       : Schönberger et al.

It is certified that error appears in the above-identified patent and that said Letters Patent is hereby corrected as shown below:

In the Claims

In Column 12, Line 19, in Claim 9, delete "adiacent" and insert -- adjacent --, therefor.

In Column 12, Line 27, in Claim 9, delete "adiacent" and insert -- adjacent --, therefor.

Signed and Sealed this
Seventh Day of October, 2014

Michelle K. Lee
*Deputy Director of the United States Patent and Trademark Office*